(12) United States Patent
Reichard et al.

(10) Patent No.: US 7,952,225 B2
(45) Date of Patent: May 31, 2011

(54) MODULAR VEHICLE POWER SYSTEM

(75) Inventors: Jeff A. Reichard, Ridgeland, MS (US); Larry Monroe Ables, Ridgeland, MS (US); David Bryant Moak, Jr., Ridgeland, MS (US)

(73) Assignee: Diversified Technology, Inc., Ridgeland, MS (US)

( * ) Notice: Subject to any disclaimer, the term of this patent is extended or adjusted under 35 U.S.C. 154(b) by 328 days.

(21) Appl. No.: 12/176,480

(22) Filed: Jul. 21, 2008

(65) Prior Publication Data

US 2009/0097292 A1  Apr. 16, 2009

Related U.S. Application Data

(60) Provisional application No. 60/950,939, filed on Jul. 20, 2007.

(51) Int. Cl.
*B60L 1/00* (2006.01)
*B60L 3/00* (2006.01)
*H02G 3/00* (2006.01)

(52) U.S. Cl. ..................................... 307/10.1

(58) Field of Classification Search ............... 307/9.1, 307/10.1, 82
See application file for complete search history.

(56) References Cited

U.S. PATENT DOCUMENTS

| 3,702,421 | A | | 11/1972 | Grul |
| 4,599,549 | A | | 7/1986 | Mutoh et al. |
| 4,783,728 | A | * | 11/1988 | Hoffman .................. 363/37 |
| 5,184,291 | A | * | 2/1993 | Crowe et al. ............. 363/37 |
| 6,278,915 | B1 | * | 8/2001 | Deguchi et al. ........... 701/22 |
| 2003/0107352 | A1 | | 6/2003 | Downer et al. |
| 2006/0273592 | A1 | | 12/2006 | Yamabuchi et al. |
| 2007/0091653 | A1 | | 4/2007 | Leggate et al. |

FOREIGN PATENT DOCUMENTS

| EP | 0 244 186 A | 11/1986 |
| EP | 1 657 809 A | 5/2006 |

OTHER PUBLICATIONS

International Preliminary Report on Patentability for PCT/US2008/070591.
International Search Report for PCT/US2008/070591.

* cited by examiner

*Primary Examiner* — Jared J Fureman
*Assistant Examiner* — Carlos Amaya
(74) *Attorney, Agent, or Firm* — IPLM Group, P.A.

(57) ABSTRACT

A modular vehicle power system for a vehicle, the modular vehicle power system obtaining DC power the vehicle and producing AC power and method therefore. A plurality of power modules, each of the plurality of power modules receiving the DC power from the vehicle and producing the AC power, wherein each of the plurality of power modules are independent and interchangeable.

27 Claims, 9 Drawing Sheets

| Parameter | Value | Units |
|---|---|---|
| SM Zero Position | | 10 bit ADC |
| SM Mark Position | | 10 bit ADC |
| Load 0 | | 10 bit ADC |
| Load 50 | | 10 bit ADC |
| Load 100 | | 10 bit ADC |
| Load 150 | | 10 bit ADC |
| Load 200 | | 10 bit ADC |
| Load 250 | | 10 bit ADC |
| Load 300 | | 10 bit ADC |
| Load 350 | | 10 bit ADC |
| Load 400 | | 10 bit ADC |
| Precharge Time | | Milliseconds |
| Precharge Disconnect Delay | | Milliseconds |
| Engine High LED | 300 | RPM |
| Engine Med High LED | -40 | RPM |
| Engine Med LED | -50 | RPM |
| Engine Me Low LED | 200 | RPM |
| Engine Low LED | 500 | RPM |

Calibration

Fig. 10

| Parameters | Power | Faults | Communications | Calibrations | STOP |

Faults

| Type | Fault | TS/ET | Fault # |
|---|---|---|---|
| R | Low oil Pressure | 3587 | 7 |
| R | Engine Overheat | 3574 | 6 |
| R | Inverter Disabled | 1932 | 5 |
| R | Inverter Disabled | 1759 | 4 |
| R | Inverter Disabled | 1436 | 3 |
| R | Inverter Disabled | 1403 | 2 |
| R | System Startup | 15 | 1 |
| R | General Speed Controller Fault | 0 | 0 |
| M | General Speed Controller Fault | 10:19 AM | |
| M | Engine/Alt Speed Mismatch | 10:19 AM | |
| M | Low Oil Pressure | 10:19 AM | |
| M | Engine Overheat | 10:19 AM | |
| M | General Speed Controller Fault | 10:19 AM | |
| M | Engine/Alt Speed Mismatch | 10:19 AM | |
| M | Low Oil Pressure | 10:19 AM | |

| Get Recorded | Clear Recorded | O M O R O Both | Clear |

Type
M = Monitored
R = Recorded

TS = Host timestamp of monitored messages
ET = Elapsed system time for recorded messages Fault Condition

Fig. 12

Gauges / Monitoring

MODULAR VEHICLE POWER SYSTEM

RELATED APPLICATION

This application claims priority to provisional U.S. Application Ser. No. 60/950,939, filed Jul. 20, 2007.

STATEMENT REGARDING FEDERALLY SPONSORED RESEARCH OR DEVELOPMENT

This invention was made with government support under contract W9113M-07-C-0133 awarded by the U.S. Army Space and Missile Defense Command. The government has certain rights in the invention.

FIELD

This invention relates generally to vehicle power systems and, more particularly, modular vehicle power systems producing AC power from a vehicle's DC power and methods thereof.

BACKGROUND

Compact, and potentially mobile, AC electrical power for a variety of electronic equipment is needed. Military applications include tactical wheeled vehicles which may need AC electrical power for associated tactical equipment such as radar sets, command and control shelters and other portable equipment.

Other areas where mobile power may be desired include, but are not limited to, storm/disaster relief efforts, e.g., hurricanes, first responders, health care, facility emergency power, water purification centers, communications centers, retail shops and gas/refueling centers.

A common means to establish the capability of providing a sufficient supply of AC electrical power is to tow a trailer-mounted AC electrical power generator that is powered by diesel or other fuel. A trailer-towed solution, however, tends to be bulky and limits the maneuverability of the towing vehicle. Further, the separate trailer-towed generation system usually requires its own specialized operation and maintenance skill set.

SUMMARY

Thus, there is a significant need for a compact, mobile, AC power generation system which may be mounted in or on the tactical vehicle and which is powered by the vehicle's existing power system. Utilizing the vehicle's engine may reduce the skill set that may be required because there may be no additional power plant to maintain/operate and may also remove the necessity of having separate fueling systems which may reduce (re)fueling schedules.

Such so-called On Board Vehicle Power ("OBVP") systems may be essential for mobile applications, where AC power requirements is required but trailer towed or conventional generator-based solutions are not practical. These applications are most relevant to, but not limited to, military applications. In on board vehicle power, the vehicle itself becomes the electric power generator providing AC power from the DC power from the electrical system of the vehicle itself. The System may be used for mobile power generation or in stationary mode applications. Increased mobility of power generation equipment is needed because trailer-towed generator solutions are not suitable for all locations where AC power may be needed. Applications where an OBVP-styled solution would be better able to meet AC power requirements than a conventional generator-based solution would be: 1) Applications that require significant AC power "on-the-move" 2) Applications that require AC power, but also require a limited footprint (e.g. no room for a generator) 3) Applications that require AC power but it is not possible to transport a generator (e.g. a helicopter drop of a single vehicle for transportation and AC power needs like battery chargers, portable equipment chargers, and intermittent operation of stationary AC powered equipment like tools, environmental control equipment, and portable tools) 4) Any small generator (<10 KW) application could also be served by an OBVP-styled solution. Provisions for extreme environmental conditions were designed into the System. These environmental provisions allow OBVP-equipped vehicles to have the same water-fording and environmental limits as vehicles that do not have OBVP. This capability expands the capabilities of an OBVP-equipped vehicle without unnecessarily limiting normal vehicle uses and applications. Also, these environmental considerations make the system more suitable for installations on tactical wheeled vehicles.

Embodiments of the invention provide a highly mobile and rugged power-inverter system designed to withstand harsh environments, while providing on-demand power for deployment in battle theaters. Embodiments of the light weight power system (as compared to diesel powered tactical quiet generator sets) may offer three compact mounting schemes located on the High Mobility Multipurpose Wheeled Vehicle (HMMWV), therefore eliminating the trailer towed diesel power generator solution. The System may be designed to meet stringent military requirements from the ground up. The System may be capable of providing peak three phase power outputs up to 10 KW and/or single phase outputs up to 3.3 KW. The System may be operational for both single phase (@ 120VAC) and three phase outputs (@ 208VAC); using the vehicle's 28VDC input source. The System may be able to produce voltage outputs at 50 Hz (for international applications), 60 Hz (for domestic applications) and 400 Hz (for aircraft and radar applications). The System may offer calibration parameters in order to customize the inverter for the specific requirements. The System may also have a communications protocol interface capable of transferring data to an independent throttle control system, whose purpose is to monitor the electrical load across the output and vary the vehicle's engine RPM to maintain optimum vehicle efficiency. The System may include accessories that provide functional feedback of the system as it relates to calibration, diagnostics and fault condition tracking.

In an embodiment, the present invention provides a modular vehicle power system for a vehicle, the modular vehicle power system obtaining DC power the vehicle and producing AC power. A plurality of power modules, each of the plurality of power modules receiving the DC power from the vehicle and producing the AC power, wherein each of the plurality of power modules are independent and interchangeable.

In an embodiment, the vehicle power system comprises at least three of each of the plurality of power modules, each one of the at least three of the plurality of power modules being associated with one of at least three phases of the AC power.

In an embodiment, the DC power has an input voltage and wherein each of the plurality of power modules utilize a variable switching frequency based upon the input voltage.

In an embodiment, the variable switching frequency increases as the input voltage increases.

In an embodiment, the variable switching frequency maintains an approximately constant voltage/frequency relationship.

In an embodiment, each of the plurality of power modules comprises a first power converter receiving the DC power from the vehicle, the first power converter utilizing a full MOSFET H-bridge producing a first AC power output; a center-tapped power transformer receiving and rectifying the first AC power output to create a filtered DC voltage; and a second power converter receiving the filtered DC signal, the second power converter utilizing a full MOSFET H-bridge to convert the filtered DC signal into a second AC power output.

In an embodiment, each of the plurality of power modules further comprises a local inductor output filter coupled to the second AC power output providing a first filtered AC output.

In an embodiment, each of the plurality of power modules further comprises an input power clipping circuit operatively coupled to the DC power.

In an embodiment, each of the plurality of power modules comprises a plurality of power boards.

In an embodiment, each of the plurality of power boards of each of the plurality of power modules are coupled in series.

In an embodiment, each of the plurality of power boards has a first power converter receiving the DC power from the vehicle, the first power converter utilizing a full MOSFET H-bridge producing a first AC power output; a center-tapped power transformer receiving and rectifying the first AC power output to create a filtered DC voltage; and a second power converter receiving the filtered DC signal, the second power converter utilizing a full MOSFET H-bridge to convert the filtered DC signal into a second AC power output.

In an embodiment, the system has a general output filter coupled to the second AC power output of each of the plurality of power boards producing a combined AC output representing a power output for one of each of the at least three single phases of the AC power.

In an embodiment, the second power converter operates at near 100% duty cycle.

In an embodiment, the system has a system chassis and wherein each of the plurality of power modules are individually, removably electrically, mechanically and thermally coupled to the system chassis.

In an embodiment, each of the plurality of power modules are substantially environmentally sealed from liquid immersion.

In an embodiment, wherein an individual seal between the system chassis and each of the plurality of power modules.

In an embodiment, each of the plurality of power modules further has a heatsink, a power transformer and a machined transformer cup, the machined transformer cup and the individual seal coupling the power transformer to the heatsink providing thermal conductivity between the power transformer and the heatsink.

In an embodiment, the vehicle has a motor coupled with a throttle control and wherein the modular vehicle power system further comprises a speed controller operatively coupled with the throttle control of the vehicle and with each of the plurality of power modules to increase a speed of the motor of the vehicle in response an increased applied load from the modular vehicle power system.

In an embodiment, the present invention provides a method of providing AC power from a vehicle producing DC power. A plurality of independent and interchangeable power modules, each of the plurality of power modules receiving the DC power from the vehicle and producing the AC power, are provided. The plurality of independent and interchangeable power modules are operated to provide multiple phase AC power. Each of the plurality independent and interchangeable power modules may operate for any one phase of the multiple phase AC power.

In an embodiment, at least three of each of the plurality of power modules are provided, each one of the at least three of the plurality of power modules being associated with one of at least three phases of the AC power.

In an embodiment, a variable switching frequency based upon the input voltage is utilized.

In an embodiment, the variable switching frequency increases/decreases as the input voltage increases/decreases.

In an embodiment, the variable switching frequency maintains an approximately constant voltage/frequency relationship.

In an embodiment, a plurality of power boards for each of the plurality of power modules is provided.

In an embodiment, each of the plurality of power boards of each of the plurality of power modules are coupled in series.

In an embodiment, each of the plurality of power modules are removably electrically, mechanically and thermally coupled to a system chassis.

In an embodiment, each of the plurality of power modules are substantially sealed from liquid immersion.

In an embodiment, an individual seal between the system chassis and each of the plurality of power modules.

In an embodiment, a power transformer is thermally coupled to a heatsink.

In an embodiment, a throttle of the vehicle is increased responsive to an increased load for the AC power.

DRAWINGS

FIG. 10 is an illustration of a calibration display;

FIG. 12 is an illustration of a fault condition display; and

DESCRIPTION

The contents of provisional U.S. Application Ser. No. 60/950,939, filed Jul. 20, 2007, is hereby incorporated by reference in its entirety.

System 10 is a fully enclosed chassis utilizing conduction cooled techniques for heat dissipation requirements. System is a waterproof system designed to withstand harsh environments, as well as rugged terrain. The exterior shell contains finned extrusions 12 for heat dissipation. System 10 is compact and multiple mounting solutions are possible. System 10 has an overall size of approximately 29.75 inches by 21 inches by 15.25 inches and can provide AC power in excess of 10 kilowatts peak.

Figure 1:
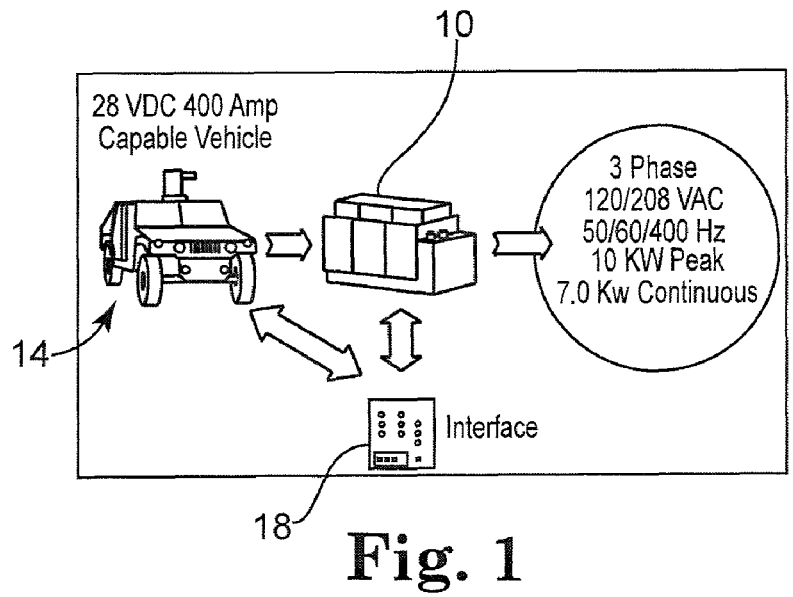
FIG. 1 is an illustration of the environment and capability of the System.
Figure 2:
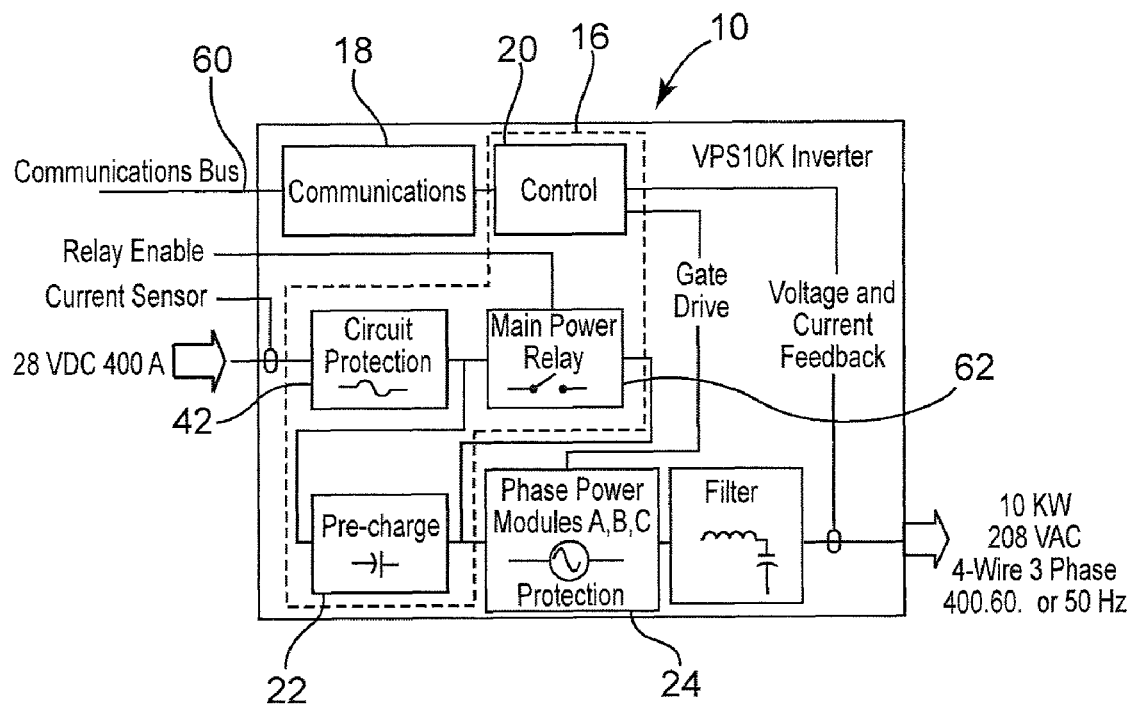
FIG. 2 is a system block diagram.

System 10 gathers its power source from an already established configuration available on a vehicle 14 (see FIG. 1) utilizing, for example, a 28 Volt-DC/400 Ampere alternator. System 10 may contain a power inverter, a speed controller and user's interface box 18 (FIG. 2). System 10 contains control circuitry 20, pre-charge & protection circuitry 22, phase power modules 24 (3) with voltage and current feedback capabilities. The speed controller monitors the vehicle and power systems to provide a response to the throttle in the event additional RPM is required for the applied load. System interface 18 provides the operator with indicators that display System's 10 status.

System 10 is modular allowing for easier installation and maintenance activities. Each phase power module 24 is interchangeable and functions as one phase of the three phase power system. Each power module 24 can be removed and replaced quickly. This lowers maintenance costs, limits down-time, and increases reliability. The modular approach also allows limited system functionality if one of the modules 24 is damaged. After removing damaged module 24, system 10 can function in a one or two phase configuration.

System 10 is environmentally sealed from immersion or other harsh conditions utilizing custom rubber seals 26 (FIG. 3) and 66 (FIG. 8) around all mechanical joints in the chassis. Seals 26 provide protection for the internal components of the system 10. The unique configuration of seals 26 and 66 make system 10 more rugged.

Figure 9:
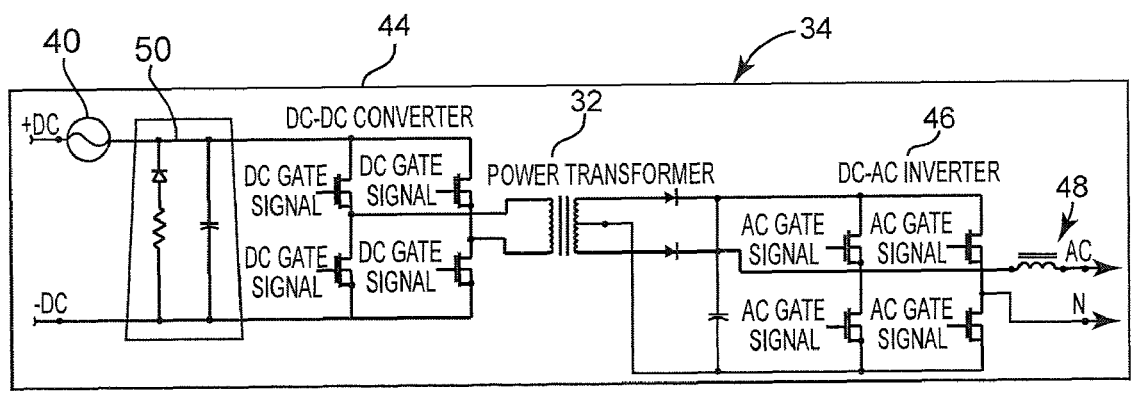
FIG. 9 is a power board functional diagram.

Extrusion 28, used as a heat-sink for the power board, is designed and machined to include cup 30 installed with seal 26 to house power transformer 32 for each power conversion assembly 34 (FIG. 9). Cup 30 is cooled (and the extrusion heated) and inserted along with environmental seal 26 allowing for a thermal bond (along with an environmental seal). This bond allows for maximum thermal connectivity between fins 12 of extrusion 28 and cup 30. This bond combined with seal 26 and surrounding potting material provides thermal relief for power transformer 32 and environmental protection for the circuitry.

A plurality of power assemblies 34 may be used in each power module 24. Housing 36 for power assemblies 34 includes mounts to allocate the minimum amount of space necessary to install the circuit boards, output filter 38 and fuse board 40. Power module 24 is assembled with power assemblies 34 wired in series and adjacent to each other in order to minimize the amount of wire needed for connections and to allow the space for mounting necessary filter 38 and fuse 40 boards.

System 10 obtains its input power from an alternator or battery source capable of providing 28VDC, e.g. from vehicle 14. Full output power from System 10 may require the input DC power source to be rated at 400 A or higher. At the input, system 10 is protected by a circuit breaker 42 rated at the overload capacity of the input source. Additionally, each power assembly 34 is protected by a smaller fuse 40 designed to prevent catastrophic damage to the components. After applying input voltage, system 10 provides its output through a series of DC-DC converters 44 and DC-AC inverters 46 arranged for maximum efficiency. The output of inverters 46 is filtered utilizing a distributed output filter 48. The output voltage, frequency and phase rotation of system 10 are controlled by a signal processor 20 (and software) by manipulating the switching scheme of DC-AC inverters 46. Signal processor 20 also monitors output current and output voltage to assure safe operation of System 10. If conditions are not within acceptable parameters, system 10 will shutdown, protecting the components of the system, the load, host vehicle, and operating personnel.

System 10 utilizes an individual power board arrangement, where multiple power conversion assemblies 34 are run in series generating the required AC output. Each power assembly 34 generates a portion of the output.

System 10 may provide three phase power in a tiered modular package. Each phase power module 24 provides one phase of the three-phase output and is fully interchangeable. If one or more of the power module(s) 24 fail, it can be removed from system 10 and the remaining module(s) 24 will be capable of providing full rated output for an individual phase of system 10. Each phase module 24 is comprised of three identical power assemblies 34 (with an input clipping circuit 58 and a distributed output filter 48).

System 10 may utilize a variable switching frequency, based on input voltage, to the power conversion electronics to maintain a constant voltage/frequency relationship reducing the size of the transformer required in the design. This also provides less switching losses at the MOSFET's by increasing the switching speed with the voltage; lowering the current requirements and increasing overall efficiency.

Each power assembly 34 includes power conversion technology utilizing full H-bridge MOSFET designs. The output of each power assembly 34 is configured in series in order to provide the rated power of system 10 (three power assemblies 34 in series). This configuration provides improved load sharing; increasing efficiency and heat dissipation.

System 10 uses a distributed output filter 48 to generate the three phase power. Each power assembly 34 includes a small inductive filter 48. The output configuration of these boards runs in series adding inductance. At the end of the chain of power assemblies 34, the full rated signal is filtered through a larger inductor 54 and capacitor 56 to complete the output of the phase. This distributed output filter provides better heat dissipation due to load sharing and improves efficiencies.

System 10 uses voltage clipper 58, protecting system 10 from dangerous transient voltages at the input source. These transients could cause damage to the electronics within system 10, thus raising the failure rate. Clipper 58 is located in each phase power module 24 and improves the reliability of power module 24 and system 10.

Referring now to System 10 in more detail, FIG. 2 (System Block Diagram) illustrates the overall system view of System 10.

Communications

System 10 publishes parameter information over communications bus 60. This information is used for an indicator accessory to interface 18 providing the user with system status and fault condition tracking.

Control

System 10 uses system components to monitor the output voltages and currents to provide necessary automatic protections for the user and system 10. Control 20 also controls the switching frequency of the DC-AC inverter 46 in order to provide the proper output voltage, frequency and phase rotation.

Pre-Charge

Pre-charge protection 22 is designed within System hardware allowing the input voltage to the DC-DC converter 44 to ramp slowly during pre-charge conditions. This provides protection to the components of System 10 by slowly applying the input voltage to System 10.

Phase Power Modules

Phase power modules 24 of System 10 house DC-DC converters 44, DC-AC inverters 46, gate drivers, input clipping circuitry 58 and output filters 48. Three power assemblies 34 are configured in series to supply the AC output.

Safeties (Fuses/Main Power Relay)

Circuit breaker 42 and main power relay 62 of System 10 is used for protection purposes for over current faults and is also used for emergency shut-off.

General Description

Figure 3:
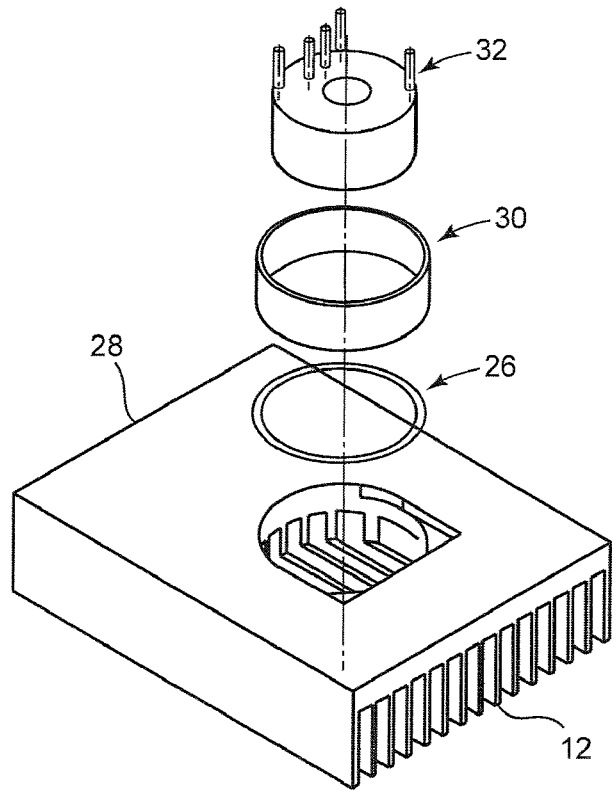
FIG. 3 illustrates a heat sink assembly.

Each power assembly 34 is constructed using a machined aluminum extrusion 28 for the greatest surface area for conduction cooling. After this operation is complete, cup 30 is machined to hold power transformer 32 and potting material. Cup 30 and heat-sink 12 are designed for an interference fit to maximize the thermal bond. This maximizes the heat transfer of power transformer 32 (and potting material) into the finned extrusion 28. Seal 26 is added between cup 30 and heat-sink 28 as part of the system's environmental sealing scheme. The assembly process is illustrated in FIG. 3. After this process, power assemblies 34 are installed onto the heat-sinks completing the operation.

Figure 4:
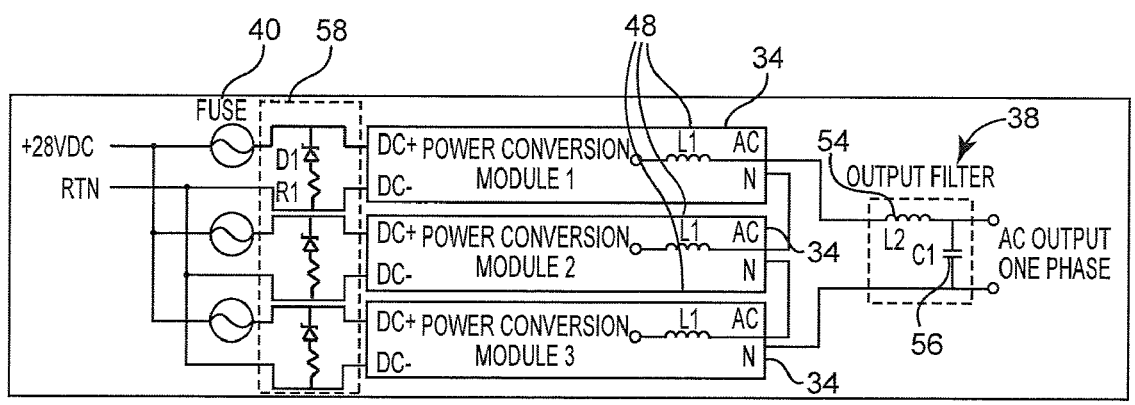
FIG. 4 illustrates the module series configuration and output filter.

Power assemblies 34 are connected in series and utilize a distributed output filter, illustrated in FIG. 4. Each power assembly 34 provides a portion of the AC output. The series configuration of power assemblies 34 provides better load sharing and allows system 10 to operate at the high power levels required by the applications. L1 in this configuration is the internal inductance of each circuit board, and the L2/C1 combination provides the final output filtering 38. These are tuned together in order to provide the proper heat dissipation, improving the efficiency of each phase and transferring some of the heat away from the power boards. FIG. 4 also illustrates input voltage clipper 58 provided by power assembly 34. The D1/R1 combination provides protection to the system by ensuring the transient voltages are snubbed before causing damage to the internal components. This part of System may be uniquely designed to operate in a +28VDC automotive environment (provided by the input source).

Figure 5:
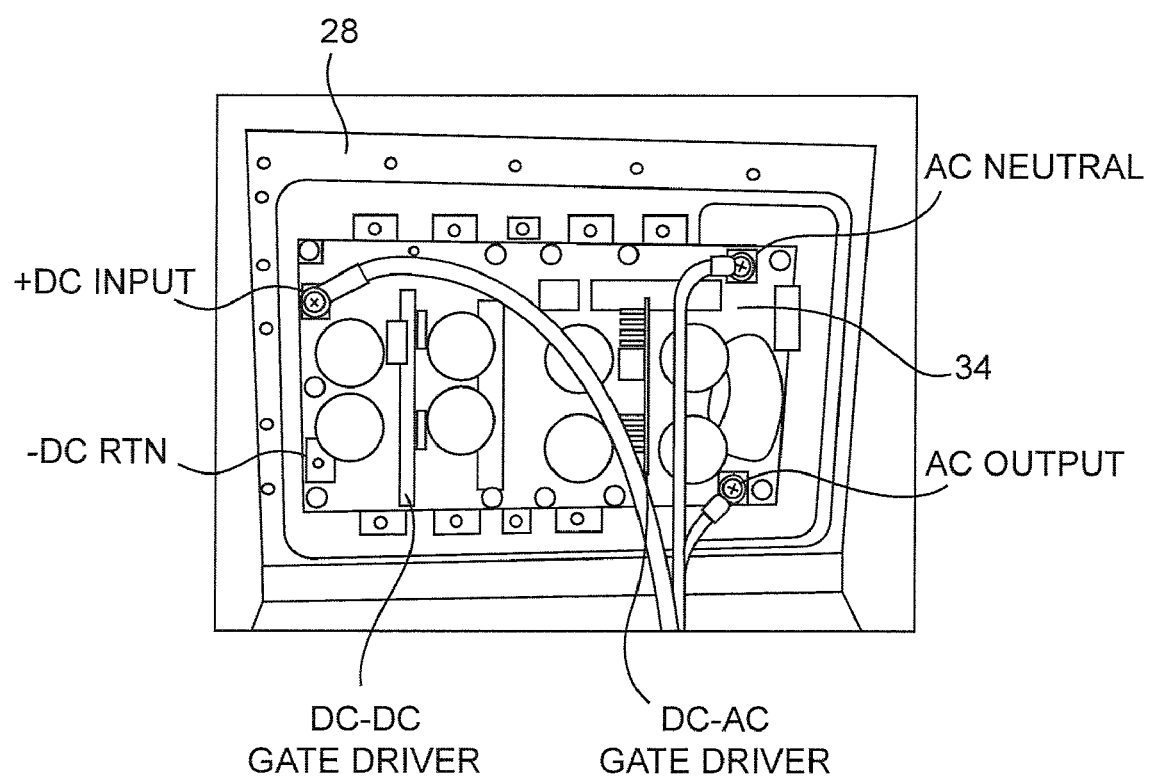
FIG. 5 is an illustration of a power module.
Figure 6:
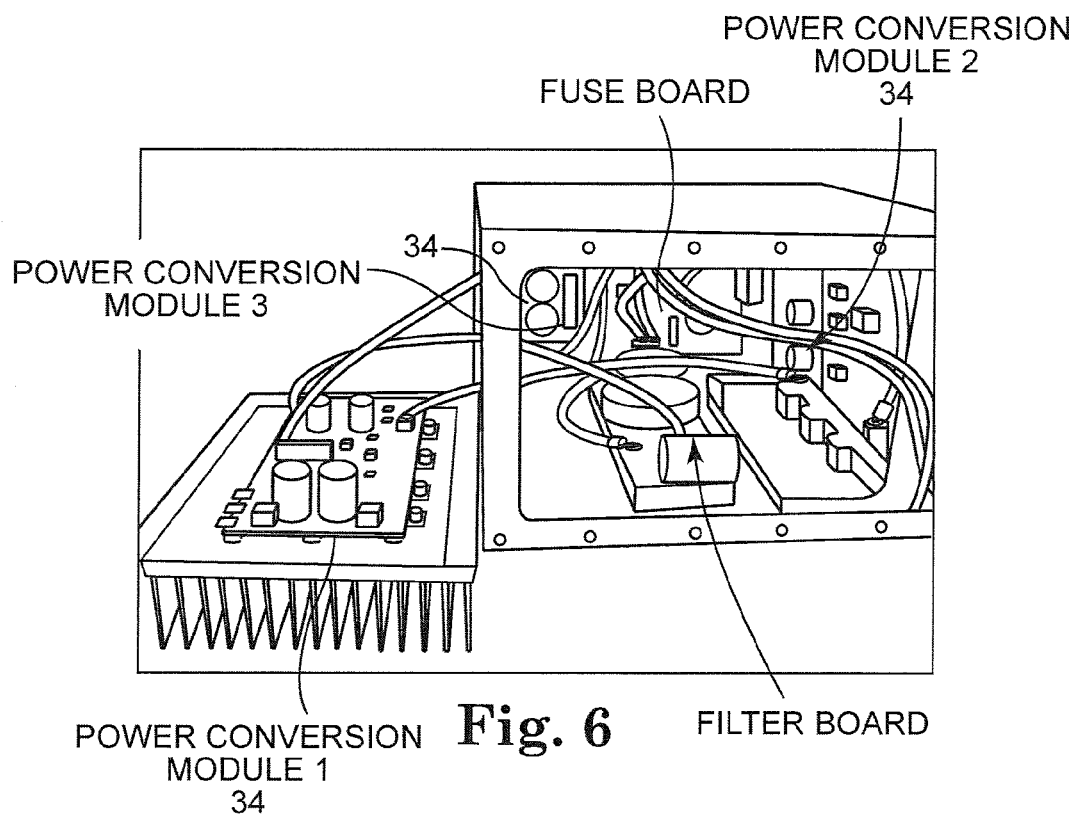
FIG. 6 is an illustration of power module component locations.

Power assemblies 34 are installed onto completed heat-sinks 28, as illustrated in FIG. 5. Power assemblies 34 are then configured in series, with the input fuse/transient protection board 40 and output filter 38 connected (see FIG. 6). The mounting methods for the fuse board and output filter prepare the system for rugged environments, while maintaining the crucial electrical characteristics for operation.

Figure 7:
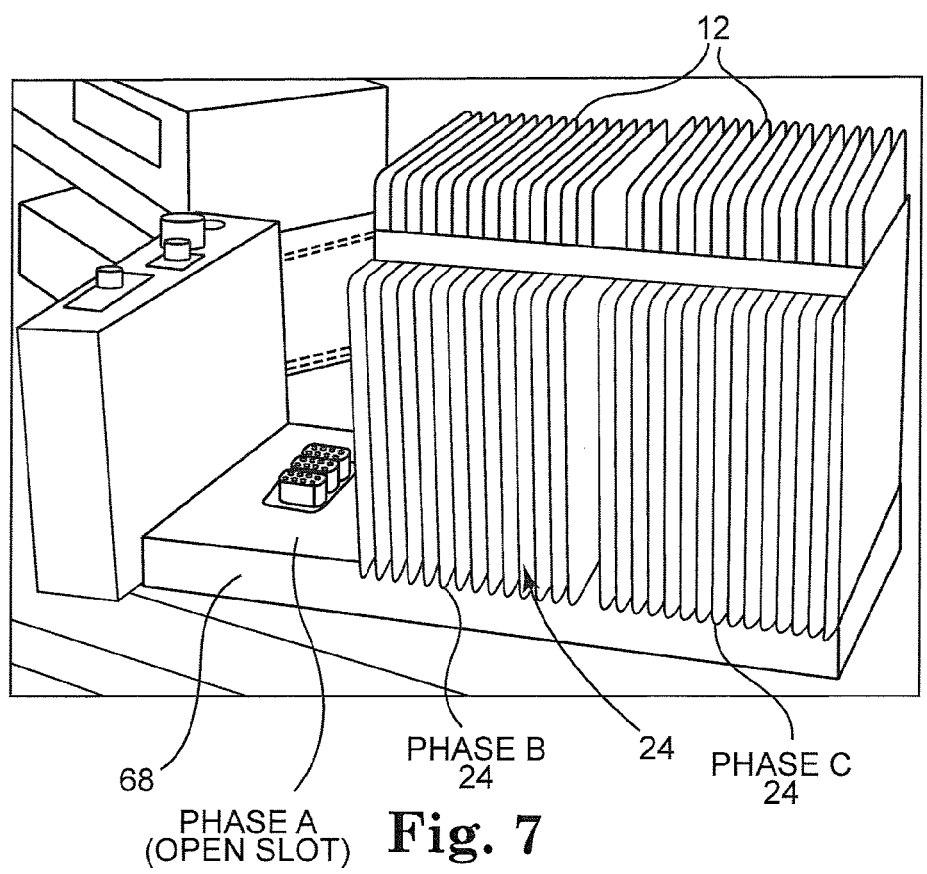
FIG. 7 is an illustration of phase power modules with phase A removed.

The configuration for the three individual phase power modules 24 has been engineered to simplify and offer additional safety precautions for both assembly and maintenance of the system. Phase power modules 24 are constructed to provide rugged, environmentally sealed enclosures for the power electronics. This concept was taken one step further in developing a means of interconnects eliminating the need for wiring requirements when replacing any of the three power phase modules 24. Each of the three phase modules 24 are interchangeable, they can be placed in any of the A, B, or C phase slots and can be swapped as needed. To remove a phase power module 1) remove mounting screws 2) remove the phase power module 24 and 3) replace the phase power module 24 assembly with another module 24 (see FIG. 7).

Figure 8:
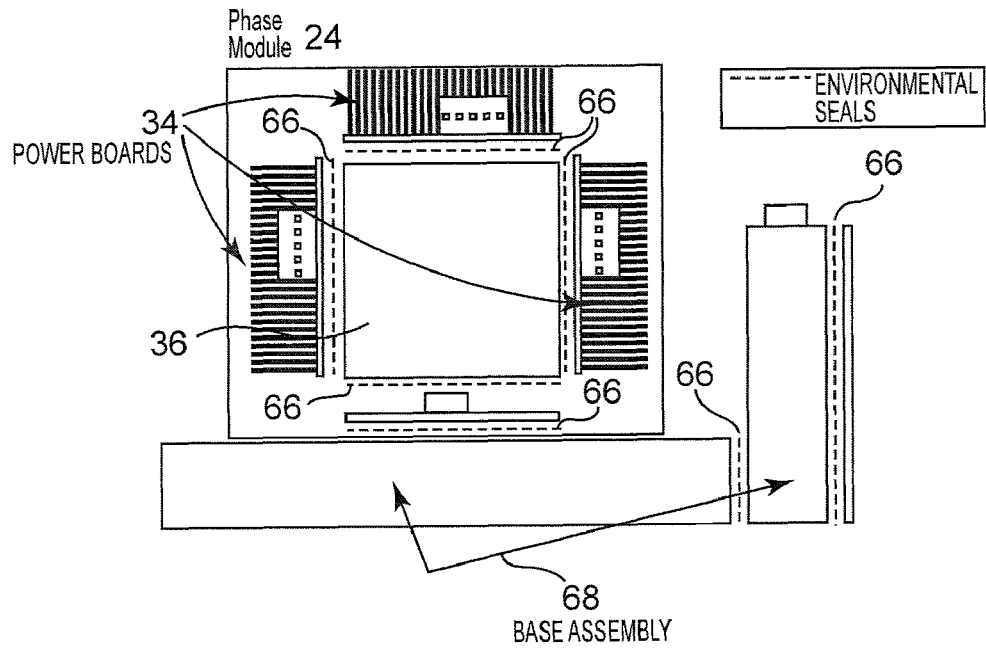
FIG. 8 is an illustration of seal configuration.

Standard maintenance cycles for System 10 is reduced based on the modular construction of power modules 24. This modular configuration also provides extended life cycles of the product. Degraded modes of operation are also possible. If a phase power module 24 is damaged, system 10 can operate in a single or two phase configuration with the remaining power modules 24. After removing the damaged power module 24, each of the remaining power modules 24 will be operable at one-third of the full rated load. At the base of phase power modules 24, the connections are protected by custom seals 66 creating an environmental seal protecting vital system components. Each mechanical joint in the base chassis 68 and phase power module 24 also has a custom seal 66 for the required protection. The seal configuration is illustrated in FIG. 8.

The electrical design of power assemblies 34 utilize standard MOSFET H-bridge technology for power conversion in DC-DC converter 44 (illustrated in FIG. 9). This technology utilizes a variable switching frequency at the DC gate driver signal based on input voltage. This maintains a constant voltage/frequency relationship reducing the size of transformer 32 required in the design. This also provides less switching losses at the MOSFET's by increasing the switching frequency only when the voltage is higher and the current requirements are lower (increasing overall efficiency). Variable switching frequency for the power converters provides better efficiency and a reduced part counts and also provides for a smaller transformer. The DC gate driver monitors the MOSFET voltage drop during an 'ON' state; reducing component count and losses and compensating for a defective low voltage gate drive output. The output of DC-DC converter 44 passes through center-tapped transformer 32 rectifying the high frequency AC output is rectified to create a filtered DC voltage with increased potential. This DC voltage passes through another H-bridge DC-AC converter 46 to convert this DC signal into the AC output. The AC gate drive signal is controlled by controller 20 and passes through opto-isolation circuitry before driving the final stage of the inverter. Controller 20 sets the frequency and amplitude of the signal by modulating the switching signal of the MOSFET's. There is a localized output inductor 48 to reduce the size of the main filter inductor. The series configuration of each power assembly 34 and distributed portion of output filter 48 are illustrated in FIG. 4 to complete the output of System 10. The distributed output filter 48 allows better heat dissipation and efficiencies by sharing the inductance between three power assemblies 34.

System 10 provides a modular environmentally sealed approach, protecting the internal components and allowing rugged operation in all environments. System 10 also provides reduced maintenance costs due to the solid state design and provides functionality in the event of a failure of a power module 24. Each power module 24 is interchangeable and can operate as any phase during operation, dependent on system location. System also provides a distributed output filter 48 allowing for improved efficiencies and heat dissipation. The switching frequency of DC to DC converter 44 is variable dependent on input voltage; providing improved efficiencies and a smaller transformer and switching devices. The series configuration of power assemblies 34 provides improved load sharing and thermal performance. The orientation and location of the components present an advantage in mechanical assembly and provide a space saving solution.

System 10 provides rugged three phase AC power for deployment in operations. System 10 is designed to be a light-weight solution when compared to similarly-rated diesel powered tactical quiet generator sets. System 10 is capable of providing three phase power up to 10 kilowatts and single phase power up to 3.3 kilowatts per phase. System 10 may be powered using a 28VDC electrical system of a vehicle. System 10 has a variable frequency at the output, selectable between 50 Hz (for international applications), 60 Hz (for domestic applications) and 400 Hz (for aircraft and radar applications). System 10 communicates important diagnostic information to other accessories.

System 10 has a modular design, saving time in maintenance and allowing partial functionality in the event of a failure or damage.

The mechanical alignment of power assemblies 34, within power modules 24, of System 10 provides space savings and ease of assembly. This alignment is also electrically unique, proving AC power utilizing three power boards in a series configuration.

The configuration of the environmental seals 66 of System 10 protects the system 10 in harsh environments.

Figure 11:
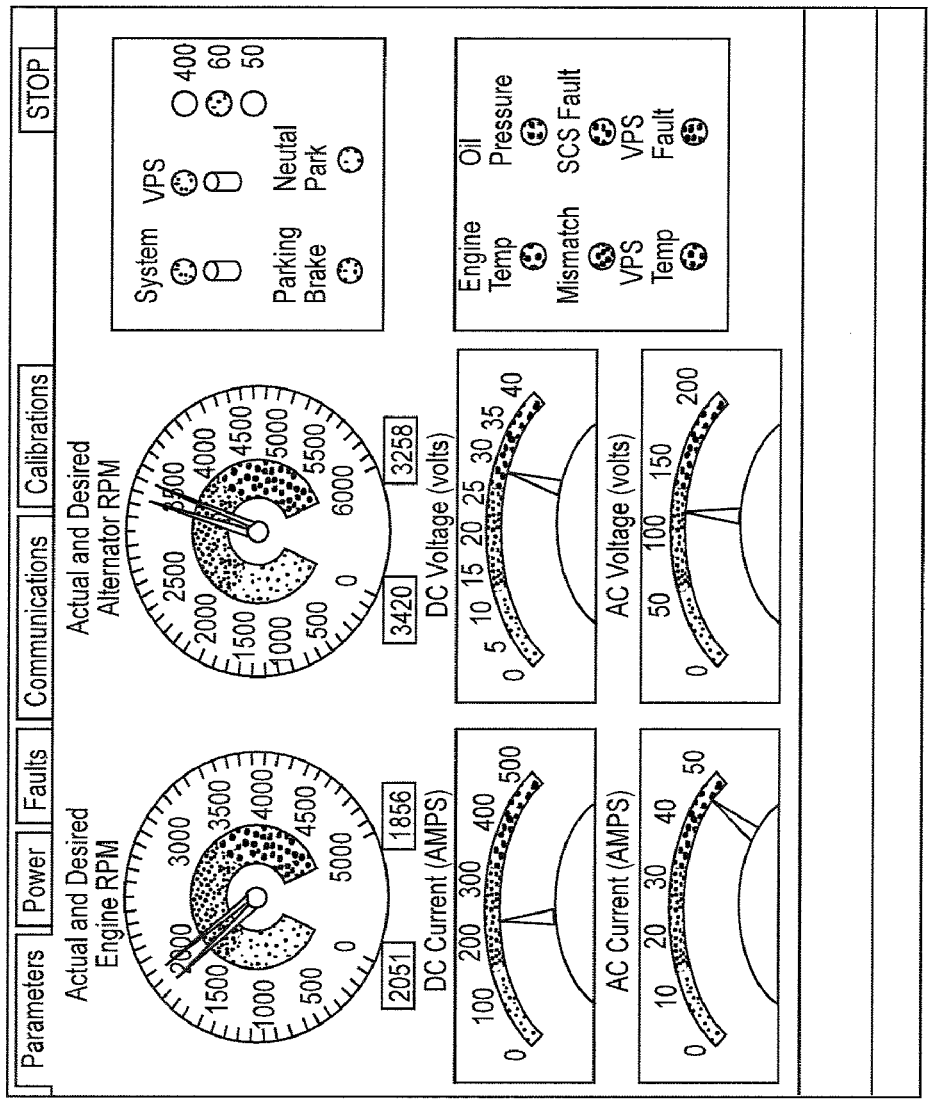
FIG. 11 is an illustration of a diagnostics display.
Figure 13:
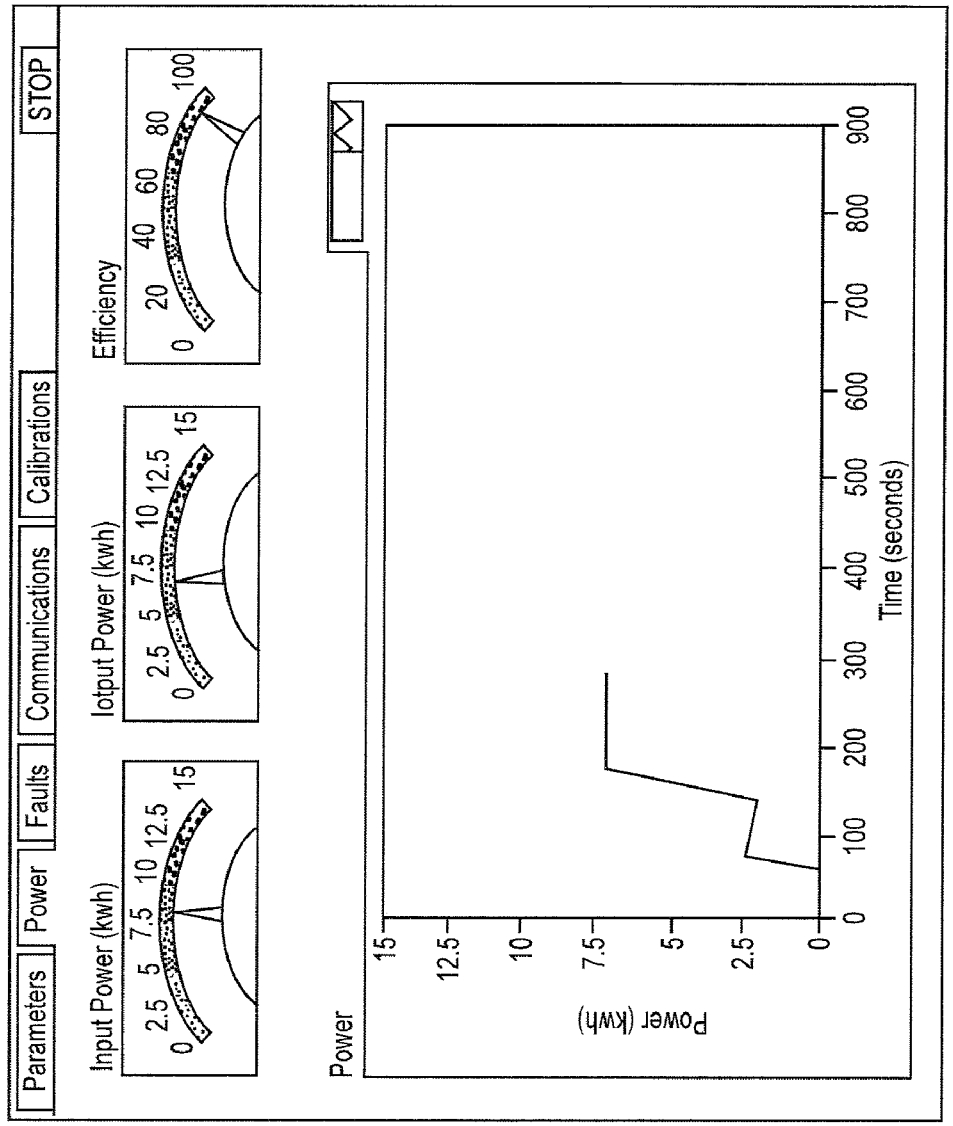
FIG. 13 is an illustration of a gauges and monitoring display.

Detailed monitoring of the system is important in managing its performance and calibrating operational parameters in order to achieve optimum performance based on the anticipated load demands of the target retrofit vehicle. Set-up and support functions are managed through a specialized software package utilizing a USB interface available for communication protocol-exchange in support of critical calibration & monitoring of the VPS10K system. This interface supports calibration (FIG. 10), diagnostics (FIG. 11), fault condition tracking (FIG. 12) and gauges and other monitoring (FIG. 13).

Overall, System 10 provides a unique solution to mobile three phase power.

An embodiment provides a modular mechanical design to allow for easier maintenance and installation.

An embodiment provides a seal configuration protecting the invention from harsh environments.

An embodiment provides a thermal configuration for the power transformer within the heat-sink allowing for better heat transfer in this application.

An embodiment provides a layout of the power boards, fuse board and output filter, maximizing space for the critical design criteria of this invention.

An embodiment provides an electrical design of the power boards, which functionally work in series to provide the AC output.

An embodiment provides a tiered modular package; providing functionality in the case of a failure, and fully interchangeable components.

An embodiment provides a distributed output filter that adds the filtering in series with the power boards and then completes the filtering at the output. This allows for better efficiency and heat dissipation.

An embodiment provides a voltage clipping technology, which provides protection to the system in a +28VDC automotive environment.

An embodiment provides a variable switching frequency for the power converters provides better efficiency and a reduced part sizes for the transformer and switching devices.

An embodiment provides a center tapped transformer for the rectification of the high frequency AC to DC section reduces the losses, as well as the component count.

An embodiment makes the output DC to AC inverter do all the voltage regulation operating the input DC to DC converter at near 100% duty cycle thereby reducing losses and eliminating components.

Thus, embodiments of the on-board vehicle power system and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A modular vehicle power system for a vehicle, said modular vehicle power system obtaining DC power said vehicle and producing AC power, comprising:
    a plurality of power modules, each of said plurality of power modules receiving said DC power from said vehicle and producing said AC power, wherein each of said plurality of power modules are independent and interchangeable;
    wherein said DC power has an input voltage and wherein each of said plurality of power modules utilize a variable switching frequency based upon said input voltage.

2. The modular vehicle power system as in claim 1 wherein said vehicle power system comprises at least three of each of said plurality of power modules, each one of said at least three of said plurality of power modules being associated with one of at least three phases of said AC power.

3. The modular vehicle power system as in claim 2 wherein each of said plurality of power modules comprises a plurality of power boards.

4. The modular vehicle power system as in claim 3 wherein each of said plurality of power boards of each of said plurality of power modules are coupled in series.

5. The modular vehicle power system as in claim 1 wherein said variable switching frequency increases as said input voltage increases.

6. The modular vehicle power system as in claim 5 wherein said variable switching frequency maintains an approximately constant voltage/frequency relationship.

7. The modular vehicle power system of claim 1 wherein said vehicle has a motor coupled with a throttle control and wherein said modular vehicle power system further comprises a speed controller operatively coupled with said throttle control of said vehicle and with each of said plurality of power modules to increase a speed of said motor of said vehicle in response an increased applied load from said modular vehicle power system.

8. A modular vehicle power system for a vehicle, said modular vehicle power system obtaining DC power said vehicle and producing AC power, comprising:
    a plurality of power modules, each of said plurality of power modules receiving said DC power from said vehicle and producing said AC power, wherein each of said plurality of power modules are independent and interchangeable and wherein each of said plurality of power modules comprises:
        a first power converter receiving said DC power from said vehicle, said first power converter utilizing a full MOSFET H-bridge producing a first AC power output;
        a center-tapped power transformer receiving and rectifying said first AC power output to create a filtered DC voltage; and
        a second power converter receiving said filtered DC signal, said second power converter utilizing a full MOSFET H-bridge to convert said filtered DC signal into a second AC power output.

9. The modular vehicle power system as in claim 8 wherein each of said plurality of power modules further comprises a local inductor output filter coupled to said second AC power output providing a first filtered AC output.

10. The modular vehicle power system of claim 8 wherein each of said plurality of power modules further comprises an input power clipping circuit operatively coupled to said DC power.

11. A modular vehicle power system for a vehicle, said modular vehicle power system obtaining DC power said vehicle and producing AC power, comprising:
    a plurality of power modules, each of said plurality of power modules receiving said DC power from said vehicle and producing said AC power, wherein each of said plurality of power modules are independent and interchangeable;
    wherein said vehicle power system comprises at least three of each of said plurality of power modules, each one of said at least three of said plurality of power modules being associated with one of at least three phases of said AC power; and wherein each of said plurality of power modules comprises a plurality of power boards comprising:
- a first power converter receiving said DC power from said vehicle, said first power converter utilizing a full MOSFET H-bridge producing a first AC power output;
- a center-tapped power transformer receiving and rectifying said first AC power output to create a filtered DC voltage; and
- a second power converter receiving said filtered DC signal, said second power converter utilizing a full MOSFET H-bridge to convert said filtered DC signal into a second AC power output.

12. The modular vehicle power system of claim 11 further comprising a general output filter coupled to said second AC power output of each of said plurality of power boards producing a combined AC output representing a power output for one of each of said at least three single phases of said AC power.

13. The modular vehicle power system of claim 11 wherein said second power converter operates at near 100% duty cycle.

14. A modular vehicle power system for a vehicle, said modular vehicle power system obtaining DC power said vehicle and producing AC power, comprising:
- a plurality of power modules, each of said plurality of power modules receiving said DC power from said vehicle and producing said AC power, wherein each of said plurality of power modules are independent and interchangeable; and
- a system chassis, wherein each of said plurality of power modules are individually, removably electrically, mechanically and thermally coupled to said system chassis;
- wherein each of said plurality of power modules are substantially environmentally sealed from liquid immersion.

15. The modular vehicle power system of claim 14 wherein an individual seal between said system chassis and each of said plurality of power modules.

16. The modular vehicle power system of claim 15 wherein each of said plurality of power modules further comprises a heatsink, a power transformer and a machined transformer cup, said machined transformer cup and said individual seal coupling said power transformer to said heatsink providing thermal conductivity between said power transformer and said heatsink.

17. The method of claim 14 wherein an individual seal between said system chassis and each of said plurality of power modules.

18. The method of claim 17 wherein said substantially sealing step comprises thermally coupling a power transformer to a heatsink.

19. A method of providing AC power from a vehicle producing DC power, comprising the steps of:
- providing a plurality of independent and interchangeable power modules, each of said plurality of power modules receiving said DC power from said vehicle and producing said AC power;
- operating said plurality of independent and interchangeable power modules to provide multiple phase AC power; and
- utilizing a variable switching frequency based upon said input voltage;
- wherein each of said plurality independent and interchangeable power modules may operate for any one phase of said multiple phase AC power.

20. The method as in claim 19 wherein said providing step comprises providing at least three of each of said plurality of power modules, each one of said at least three of said plurality of power modules being associated with one of at least three phases of said AC power.

21. The method as in claim 20 wherein said providing step a plurality of power modules step further comprises providing a plurality of power boards for each of said plurality of power modules.

22. The method as in claim 21 wherein each of said plurality of power boards of each of said plurality of power modules are coupled in series.

23. The method as in claim 19 wherein said variable switching frequency increases/decreases as said input voltage increases/decreases.

24. The method as in claim 23 wherein said variable switching frequency maintains an approximately constant voltage/frequency relationship.

25. The method of claim 19 further comprising the step removably electrically, mechanically and thermally coupling each of said plurality of power modules to a system chassis.

26. The method of claim 25 further comprising the step of substantially sealing each of said plurality of power modules from liquid immersion.

27. The method of claim 19 further comprising the step of increasing a throttle of said vehicle responsive to an increased load for said AC power.

* * * * *